(12) United States Patent
Cuppers et al.

(10) Patent No.: US 8,734,282 B2
(45) Date of Patent: May 27, 2014

(54) OPERATION METHOD FOR AT LEAST ONE FORM-LOCKING SHIFTING ELEMENT OF AN AUTOMATIC TRANSMISSION BEFORE START-UP OF AN COMBUSTION ENGINE

(75) Inventors: Ruben Cuppers, Wangen (DE); Thilo Schmidt, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 592 days.

(21) Appl. No.: 13/084,659

(22) Filed: Apr. 12, 2011

(65) Prior Publication Data

US 2011/0275478 A1    Nov. 10, 2011

(30) Foreign Application Priority Data

May 7, 2010  (DE) .................... 10 2010 028 760

(51) Int. Cl.
*F16H 31/00* (2006.01)
(52) U.S. Cl.
USPC ........... 475/137; 475/138; 475/116; 475/127; 475/136; 477/167; 477/174
(58) Field of Classification Search
USPC .......... 475/116, 137, 138, 127, 136; 477/167, 477/174
See application file for complete search history.

(56) References Cited

U.S. PATENT DOCUMENTS

| 5,845,756 A * | 12/1998 | Dairokuno et al. ........ 192/85.61 |
| 2009/0098972 A1 * | 4/2009 | Eckert ........................... 475/159 |
| 2009/0232673 A1 | 9/2009 | Reisch et al. |
| 2009/0264249 A1 | 10/2009 | Gloge |
| 2010/0018805 A1 * | 1/2010 | Sachdev et al. ................ 184/6.3 |

FOREIGN PATENT DOCUMENTS

| DE | 103 11 270 A1 | 9/2004 |
| DE | 10 2005 013 137 A1 | 9/2006 |
| DE | 10 2008 001 277 A1 | 10/2009 |

* cited by examiner

*Primary Examiner* — Derek D Knight
(74) *Attorney, Agent, or Firm* — Davis & Bujold, PLLC; Michael J. Bujold

(57) ABSTRACT

A method of operating at least one form-locking shifting element of an automatic transmission integrated in a drivetrain which comprises an oil pump that can be driven mechanically by an internal combustion engine and an auxiliary oil pump that can be electrically driven, before start-up of the internal combustion engine. The method including the steps of recognizing the start-up of the combustion engine and, when a start-up of the combustion engine is recognized, controlling the electrically driven auxiliary oil pump and the at least one form-locking shifting element such that, directly after the generation of a defined rotational speed difference of the at least one form-locking shifting element by the internal combustion engine, the at least one form-locking shifting element is engaged.

13 Claims, No Drawings

OPERATION METHOD FOR AT LEAST ONE FORM-LOCKING SHIFTING ELEMENT OF AN AUTOMATIC TRANSMISSION BEFORE START-UP OF AN COMBUSTION ENGINE

This application claims priority from German patent application serial no. 10 2010 028 760.1 filed May 7, 2010.

FIELD OF THE INVENTION

The invention relates to an operation method for at least one form-locking shifting element of an automatic transmission, in particular a claw-type shifting element, before start-up of the combustion engine.

BACKGROUND OF THE INVENTION

From the prior art it is known, in automatic transmissions, to use form-locking and in particular claw-type shifting elements as coupling elements in place of frictional shifting elements. This has the advantages that production costs are lower and less structural fitting space is needed. However, form-locking shifting elements have the disadvantage that due to their structure, they can only be synchronized against rotational speed differences by elaborate means.

For that reason form-locking shifting elements, in particular claw shifting elements, can only be used in automatic transmissions when they are disengaged in higher gears and engaged in lower gears. Ideally, form-locking shifting elements are always used when they can remain engaged in all the low gears and in the reversing gear, whereby the number of actuations of form-locking shifting elements is restricted to a minimum.

If a form-locking shifting element of an automatic transmission is in the disengaged condition when the internal combustion engine is switched off, it must be brought to the engaged condition when the engine has been started and the hydraulic pressure supply to the transmission has been built up. This means that in hydraulic systems in which the pressure supplied is directly coupled to the rotational speed of the internal combustion engine, simple engagement of the form-locking shifting element is not possible.

To reduce power losses in hydraulic systems of automatic transmissions, in the prior art electrically driven oil pumps are used, which as a rule serve as auxiliary oil pumps. In most cases these oil pumps act in parallel with the oil pump that is driven mechanically by the internal combustion engine, which latter can only ensure an oil supply when the internal combustion engine is running at a certain minimum speed. For example, in DE 103 112 70 A1 a hybrid drive with an oil pump is described, which is powered by an electric motor via a gear system with constant gear ratio.

Furthermore, from DE 10 2005 013 137 A1 by the present applicant a method and a device are known for controlling an oil supply for an automatic transmission and a starting element, such that by means of an oil pump that can be powered mechanically by an internal combustion engine and a second oil pump that can be powered electrically, a sufficient oil supply for the hydraulic control unit of the automatic transmission and/or for the starting element, in particular an oil-cooled friction clutch, can be ensured both when the internal combustion engine is running and when it is off.

From DE 10 2008 001 277 A1 by the present applicant a method is known for operating a drivetrain of a motor vehicle, such that the drivetrain comprises at least a hybrid drive system with an internal combustion engine and an electric motor, a clutch connected between the internal combustion engine and the electric motor, a transmission arranged between the hybrid drive system and a drive output, with which a main hydraulic pump and an auxiliary hydraulic pump are associated, and a transmission-internal or transmission-external starting element.

According to the known method it is provided that when the internal combustion engine is at rest and the clutch connected between the internal combustion engine and the electric motor and the starting element are open, the procedure for electric motor starting is that with the brake pedal actuated, the auxiliary hydraulic pump is first operated at a first power level in such manner that it provides for the transmission a pressure required for holding a defined gear, and then, when a wish to start is recognized, the auxiliary pump is changed to a second power level such that at this second power level it provides the transmission with a pressure required to produce a power torque; only after the lapse of a defined time interval after the auxiliary hydraulic pump is changed from the first to the second power level, is the speed of the electric motor increased in order to provide the desired starting power or the desired starting torque.

SUMMARY OF THE INVENTION

The purpose of the present invention is to indicate a method for operating at least one form-locking shifting element of an automatic transmission integrated in a drivetrain, which comprises an oil pump that can be driven mechanically by an internal combustion engine and an auxiliary oil pump that can be driven electrically, the shifting element being in particular a claw-type shifting element, before start-up of the internal combustion engine, by implementing this method the at least one form-locking shifting element is engaged before a coupling speed difference occurs at the form-locking shifting element.

DETAILED DESCRIPTION OF THE PREFERRED EMBODIMENTS

Accordingly, a method is proposed for operating at least one form-locking shifting element of an automatic transmission integrated in a drivetrain, which comprises an oil pump that can be driven mechanically by an internal combustion engine and an auxiliary oil pump that can be driven electrically, in particular a claw-type shifting element, before the internal combustion engine is started, in which method an imminent start of the internal combustion engine is recognized, and when an imminent start of the internal combustion engine has been recognized the electrically driven auxiliary oil pump and the at least one form-locking shifting element are controlled in such manner that directly after the production of a defined rotational speed difference at the at least one form-locking shifting element by the internal combustion engine, the at least one form-locking shifting element can be engaged.

During this the pressure required for engaging the at least one form-locking shifting element is provided by the electrically driven auxiliary oil pump, whereby the piston of the at least one form-locking shifting element is pushed to just short of the contact point.

In an advantageous further development of the method proposed here, it can be provided that starting of the internal combustion engine is delayed until the electrically driven auxiliary oil pump has built up a pressure sufficient to engage the at least one form-locking shifting element and/or until the piston of the at least one form-locking shifting element has been able to move to just short of the contact point.

According to the invention, engagement of the at least one form-locking shifting element takes place immediately after the production of a defined speed difference at the form-locking shifting element by the internal combustion engine, where the defined speed difference can also have the value zero. However, in cases when the form-locking shifting element has no meshing geometry, engaging the shifting element without a speed difference is not possible, so in such a case the speed difference must be greater than zero.

According to the invention, an imminent start of the internal combustion engine can be recognized by detecting actuation of the ignition lock, actuation of the ignition, occupation of the driver's seat, opening of the driver's door and/or the presence of a starting signal for the internal combustion engine.

The invention claimed is:

1. A method of operating at least one form-locking shifting element of an automatic transmission integrated in a drivetrain which comprises an oil pump that is mechanically drivable by an internal combustion engine and an auxiliary oil pump that is electrically drivable, before start-up of the internal combustion engine, the method comprising the steps of:
   recognizing an imminent start-up of the internal combustion engine, and
   upon recognizing the imminent start of the internal combustion engine, controlling the electrically driven auxiliary oil pump and the at least one form-locking shifting element in such manner that directly after generation of a defined rotational speed difference of the at least one form-locking shifting element and the internal combustion engine, engaging the at least one form-locking shifting element.

2. The method of operating the at least one form-locking shifting element according to claim 1, further comprising the step of controlling the electrically driven auxiliary oil pump and the at least one form-locking shifting element in such manner that a pressure required for engaging the at least one form-locking shifting element is provided by the electrically driven auxiliary oil pump, whereby a piston of the at least one form-locking shifting element is moved to just short of a contact point.

3. The method of operating the at least one form-locking shifting element according to claim 1, further comprising the step of delaying the start-up of the internal combustion engine until either the electrically driven auxiliary oil pump has built up a pressure sufficient for engaging the at least one form-locking shifting element or a piston of the at least one form-locking shifting element is able to move to a position just short of a contact point.

4. The method of operating the at least one form-locking shifting element according to claim 1, further comprising the step of defining the rotational speed difference as zero.

5. The method of operating the at least one form-locking shifting element according to claim 1, further comprising the step of recognizing the imminent start of the internal combustion engine by detecting at least one of: an ignition lock actuation, an ignition actuation, occupation of a driver's seat, opening of a driver's door and presence of a starting signal for the internal combustion engine.

6. The method of operating the at least one form-locking shifting element according to claim 1, further comprising the step of using a claw-type shifting element as the at least one form-locking shifting element of the automatic transmission.

7. The method of operating the at least one form-locking shifting element according to claim 1, further comprising the step of delaying the start-up of the internal combustion engine until the electrically driven auxiliary oil pump has built up a sufficient pressure for engaging the at least one form-locking shifting element.

8. The method of operating the at least one form-locking shifting element according to claim 1, further comprising the step of delaying the start-up of the internal combustion engine until a piston, of the at least one form-locking shifting element, is able to move to a position just short of a contact point.

9. The method of operating the at least one form-locking shifting element according to claim 1, further comprising the step of defining the rotational speed difference as greater than zero.

10. The method of operating the at least one form-locking shifting element according to claim 1, further comprising the step of defining the rotational speed difference, when the at least one form-locking shifting element has no meshing geometry, as greater than zero.

11. The method of operating the at least one form-locking shifting element according to claim 1, further comprising the step of recognizing the imminent start-up of the internal combustion engine by at least one of:
   detecting actuation of the ignition lock,
   actuation of the ignition,
   occupation of a driver's seat,
   opening of a driver's door, and/or
   a presence of a starting signal for the internal combustion engine.

12. A method of operating at least one form-locking shifting element of an automatic transmission integrated in a drivetrain which comprises an oil pump that is mechanically drivable by an internal combustion engine and an auxiliary oil pump that is electrically drivable, before start-up of the internal combustion engine, the method comprising the steps of:
   recognizing an imminent start-up of the internal combustion engine by at least one of:
      detecting actuation of the ignition lock,
      actuation of the ignition,
      occupation of a driver's seat,
      opening of a driver's door, and/or
      a presence of a starting signal for the internal combustion engine,
   upon recognizing the imminent start of the internal combustion engine, controlling the electrically driven auxiliary oil pump and the at least one form-locking shifting element in such manner that immediately after generation of a defined rotational speed difference between the at least one form-locking shifting element and the internal combustion engine, engaging the at least one form-locking shifting element; and
   delaying starting of the internal combustion engine until at least one of:
      the electrically driven auxiliary oil pump builds up a sufficient pressure to engage the at least one form-locking shifting element, or
      until the piston of the at least one form-locking shifting element moves just short of a contact point.

13. A method of operating at least one form-locking shifting element of an automatic transmission integrated in a drivetrain which comprises an oil pump that is mechanically drivable by an internal combustion engine and an auxiliary oil pump that is electrically drivable, before start-up of the internal combustion engine, the method comprising the steps of:
   recognizing an imminent start-up of the internal combustion engine by at least one of:
      detecting actuation of the ignition lock,
      actuation of the ignition,
      occupation of a driver's seat, opening of a driver's door, and/or
a presence of a starting signal for the internal combustion engine,
upon recognizing the imminent start of the internal combustion engine, controlling the electrically driven auxiliary oil pump and the at least one form-locking shifting element in such manner that immediately after generation of a defined rotational speed difference between the at least one form-locking shifting element and the internal combustion engine, engaging the at least one form-locking shifting element;
delaying starting of the internal combustion engine until at least one of:
the electrically driven auxiliary oil pump builds up a sufficient pressure to engage the at least one form-locking shifting element, or
until the piston of the at least one form-locking shifting element moves just short of a contact point; and
after engaging the at least one form-docking shifting element, supplying driving power from the internal combustion engine to the automatic transmission.

\* \* \* \* \*